DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 21, 1972

904 O.G. 277

T904,032

SENSITIZING DYES FOR ELECTROPHOTOGRAPHIC COMPOSITION AND ELEMENT

George A. Reynolds and James A. Van Allan, both % Eastman Kodak Co., Kodak Park Division, 1999 Lake Ave., and Lawrence E. Contois, % Eastman Kodak Co., Kodak Park Division, 1669 Lake Ave., all of Rochester, N.Y. 14650

Filed Mar. 17, 1972, Ser. No. 235,845

**Int. Cl. G03g *5/06***

U.S. Cl. 96—1.6

No Drawing. 24 Pages Specification

This invention relates to organic compounds useful as sensitizers for organic photoconductive compositions having one of the following formulas:

I.

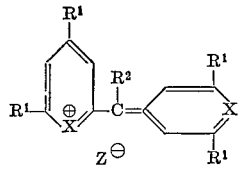

II.

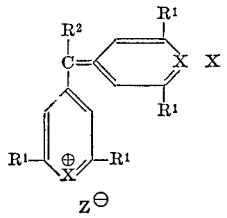

wherein:

$R^1$ represents a hydrogen atom, an alkyl radical having 1 to about 15 carbon atoms, a substituted alkyl radical wherein the alkyl moiety contains from 1 to about 15 carbon atoms and wherein the substituents are phenyl radicals or alkoxy radicals containing 1 to about 4 carbon atoms, a phenyl radical, and a substituted phenyl radical having as substituents alkyl radicals having 1 to about 15 carbon atoms or alkoxy radicals having 1 to about 4 carbon atoms;

$R^2$ represents $R^1$ and a radical having the following formula:

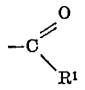

X represents a hetero atom selected from the group consisting of an oxygen and a sulfur atom; and $Z^{\ominus}$ is an anionic function.